(12) United States Patent
Moon et al.

(10) Patent No.: US 11,824,397 B2
(45) Date of Patent: Nov. 21, 2023

(54) PRE-CHARGE CURRENT CONTROL DEVICE

(71) Applicant: SAMSUNG SDI CO., LTD., Yongin-si (KR)

(72) Inventors: Soodeok Moon, Yongin-si (KR); Peelsik Jeon, Yongin-si (KR); Kyunghoon Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 742 days.

(21) Appl. No.: 16/960,173

(22) PCT Filed: Jan. 3, 2018

(86) PCT No.: PCT/KR2018/000070
§ 371 (c)(1),
(2) Date: Jul. 6, 2020

(87) PCT Pub. No.: WO2019/135417
PCT Pub. Date: Jul. 11, 2019

(65) Prior Publication Data
US 2020/0358307 A1  Nov. 12, 2020

(51) Int. Cl.
*H02J 7/00* (2006.01)
*H02H 1/04* (2006.01)
(Continued)

(52) U.S. Cl.
CPC ............ *H02J 7/345* (2013.01); *H01H 9/542* (2013.01); *H02H 1/043* (2013.01); *H02H 1/046* (2013.01);
(Continued)

(58) Field of Classification Search
CPC ................................. H02J 7/345; H02H 1/043
(Continued)

(56) References Cited

U.S. PATENT DOCUMENTS 8,164,309 B2   4/2012   Li
8,203,810 B2   6/2012   Bryan et al.
(Continued)

FOREIGN PATENT DOCUMENTS

CN   101461112 A   6/2009
CN   101645609 A   2/2010
(Continued)

OTHER PUBLICATIONS

Extended European Search Report dated Aug. 28, 2020.
(Continued)

*Primary Examiner* — Edward Tso
*Assistant Examiner* — Ahmed H Omar
(74) *Attorney, Agent, or Firm* — Lee IP Law, P.C.

(57) ABSTRACT

A device for controlling a pre-charge current generated when electrically connecting a first terminal and a second terminal, according to one embodiment of the present invention, may comprise: a switch for controlling a magnitude of a current flowing between the first terminal and the second terminal; a first resistor for generating a base voltage of a first transistor in proportion to a magnitude of the pre-charge current flowing between the first terminal and the second terminal; the first transistor for limiting the magnitude of the pre-charge current when a voltage generated by the first resistor is equal to or greater than a predetermined threshold voltage; a photocoupler for receiving, in a state insulated from a first power source, an optical signal from the first power source and supplying power; a capacitor charged by the power supplied by the photocoupler; a second transistor for controlling the magnitude of the pre-charge current on the basis of a charging voltage of the capacitor; and a second resistor for controlling an operating time of the second transistor along with the capacitor.

9 Claims, 6 Drawing Sheets

(51) Int. Cl.
    *H02J 7/34*         (2006.01)
    *H01H 9/54*        (2006.01)
    *H02H 9/02*        (2006.01)
    *H02M 1/00*       (2006.01)
    *H02H 9/00*        (2006.01)

(52) U.S. Cl.
    CPC ............ *H02H 9/002* (2013.01); *H02H 9/026* (2013.01); *H02M 1/0038* (2021.05); *H01H 2009/545* (2013.01); *H02J 2207/50* (2020.01); *Y10S 323/908* (2013.01)

(58) Field of Classification Search
    USPC .......................................................... 320/166
    See application file for complete search history.

(56) References Cited

U.S. PATENT DOCUMENTS

| | | |
|---|---|---|
| 9,214,888 B2 | 12/2015 | Bober |
| 9,584,046 B2 | 2/2017 | Sicard |
| 9,800,069 B2 | 10/2017 | Hashim et al. |
| 2008/0258551 A1 | 10/2008 | Chitta et al. |
| 2009/0015980 A1 | 1/2009 | Fukano et al. |
| 2015/0229123 A1 | 8/2015 | Ngo |
| 2017/0117722 A1 | 4/2017 | Shen et al. |
| 2017/0133837 A1 | 5/2017 | Hasan et al. |
| 2017/0166065 A1 | 6/2017 | Hong et al. |
| 2017/0294847 A1 | 10/2017 | Xie et al. |
| 2017/0317512 A1 | 11/2017 | Sung et al. |
| 2018/0191170 A1 | 7/2018 | Huang et al. |

FOREIGN PATENT DOCUMENTS

| | | |
|---|---|---|
| CN | 201601506 U | 10/2010 |
| CN | 102983607 A | 3/2013 |
| CN | 104979862 A | 10/2015 |
| CN | 105359410 A | 2/2016 |
| CN | 105706356 A | 6/2016 |
| CN | 205693367 U | 11/2016 |
| CN | 106274528 A | 1/2017 |
| JP | 2004-048888 A | 2/2004 |
| JP | 5030901 B2 | 7/2012 |
| KR | 2011-0126154 A | 11/2011 |
| KR | 10-1178018 B1 | 8/2012 |
| KR | 10-1457986 B1 | 11/2014 |
| KR | 10-2015-0043735 A | 4/2015 |
| KR | 10-2015-0050858 A | 5/2015 |
| KR | 10-2015-0061447 A | 6/2015 |
| KR | 10-2016-0103404 A | 9/2016 |
| TW | 200803110 A | 1/2008 |
| TW | I591929 B | 7/2017 |

OTHER PUBLICATIONS

Chinese Office and Search Report dated Jan. 18, 2023.
International Search Report dated Sep. 20, 2018 for PCT/KR2018/000070.
Zhen He, et al., Journal of Power Supply, A Pre-charging Control Scheme for a Single-phase Modular Multilevel Converter, vol. 15, No. 1, 49-54, Jan. 2017.
Chinese Notice of Allowance dated Jun. 28, 2023, of the corresponding CN Patent Application No. 201880089471.0.

PRE-CHARGE CURRENT CONTROL DEVICE

CROSS REFERENCE TO RELATED APPLICATIONS

This is the U.S. national phase application based on PCT Application No. PCT/KR2018/000070, filed Jan. 3, 2018, the entire contents of which is hereby incorporated by reference.

TECHNICAL FIELD

The present disclosure relates to a pre-charge current control device.

BACKGROUND ART

Today, battery pack-related technologies are being developed with the development of electric vehicles and energy storage technology, and these battery packs are generally designed with high voltage and capacity so as to drive a device.

In the initial connection between the battery pack and the device, a pre-charge phenomenon frequently occurs due to inductive and/or capacitive elements of the device. As the voltage and capacity of a battery increase, as described above, a large pre-charge phenomenon occurs.

According to the prior art, in order to prepare for this pre-charge phenomenon, a device is designed by using elements capable of withstanding high current or high voltage. Accordingly, there is a problem in that the manufacturing cost of the device increases.

In addition, the stress of each element of the device has increased by the pre-charge phenomenon, and thus, this may result in serious damage to the device.

DESCRIPTION OF EMBODIMENTS

Technical Problem

Provided are embodiments of the present disclosure in which momentarily excessive current may be prevented from being supplied to a device, so that the failure of the device or an increase in the fatigue of elements constituting the device may be prevented.

Provided are also embodiments of the present disclosure in which the generation of high momentary power generated by a pre-charge current may be prevented so that the need for the use of high-cost devices in the manufacture and design of a device may be reduced.

Solution to Problem

According to an aspect of the present disclosure, a device for controlling a pre-charge current generated when electrically connecting a first terminal and a second terminal includes a switch for controlling a magnitude of a current flowing between the first terminal and the second terminal, a first resistor for generating a base voltage of a first transistor in proportion to a magnitude of the pre-charge current flowing between the first terminal and the second terminal, the first transistor for limiting the magnitude of the pre-charge current when a voltage generated by the first resistor is equal to or greater than a predetermined threshold voltage, a photocoupler for receiving, in a state insulated from a first power source, an optical signal from the first power source and supplying power, a capacitor charged by the power supplied by the photocoupler, a second transistor for controlling the magnitude of the pre-charge current on the basis of a charging voltage of the capacitor, and a second resistor for controlling an operating time of the second transistor along with the capacitor.

The charging voltage of the capacitor may generate a base voltage of the second transistor, and as the capacitor is charged by the power supplied by the photocoupler, the second transistor may decrease a current flowing through the second transistor so as to increase a gate voltage of the switch.

The second transistor may decrease the current flowing through the second transistor so as to linearly increase the gate voltage of the switch.

The switch may increase a magnitude of a current flowing through the switch in proportion to the gate voltage of the switch.

When the voltage generated by the first resistor is equal to or greater than a predetermined threshold voltage, the first transistor may decrease the gate voltage of the switch so as to limit the magnitude of the pre-charge current.

The device may further include a third resistor for preventing a short circuit, and the third resistor may electrically connect the photocoupler and the second resistor.

A second power source may be electrically connected to the first terminal, and a load may be electrically connected to the second terminal.

The load may include a capacitive element for generating the pre-charge current.

When charging of the capacitive element is completed, the pre-charge current may be decreased, and when charging of the capacitive element is completed, the gate voltage of the switch may be maintained at a predetermined voltage by the power supplied by the photocoupler, and the switch may maintain a short-circuit state of the first terminal and the second terminal by the gate voltage maintained at the predetermined voltage.

Advantageous Effects of Disclosure

According to various embodiments of the present disclosure, momentarily excessive current can be prevented from being supplied to a device, so that the failure of the device or an increase in the fatigue of elements constituting the device may be prevented.

In addition, the generation of high momentary power generated by a pre-charge current can be prevented so that the need for the use of high-cost devices in the manufacture and design of a device can be reduced.

BEST MODE

A device for controlling a pre-charge current generated when electrically connecting a first terminal and a second terminal includes a switch for controlling a magnitude of a current flowing between the first terminal and the second terminal, a first resistor for generating a base voltage of a first transistor in proportion to a magnitude of the pre-charge current flowing between the first terminal and the second terminal, the first transistor for limiting the magnitude of the pre-charge current when a voltage generated by the first resistor is equal to or greater than a predetermined threshold voltage, a photocoupler for receiving, in a state insulated from a first power source, an optical signal from the first power source and supplying power, a capacitor charged by the power supplied by the photocoupler, a second transistor for controlling the magnitude of the pre-charge current on the basis of a charging voltage of the capacitor, and a second resistor for controlling an operating time of the second transistor along with the capacitor.

Mode of Disclosure

Advantages and features of the present disclosure, and ways to achieve them will become apparent by referring to embodiments that will be described later in detail with reference to the drawings. However, the present disclosure is not limited to embodiments presented below but may be embodied in various different forms, and it is to be appreciated that all changes, equivalents, and substitutes that do not depart from the spirit and technical scope of the present disclosure are encompassed in the present disclosure. The embodiments presented below are provided to make the disclosure of the present disclosure complete, and to fully inform the scope of the present disclosure to those skilled in the art to which the present disclosure pertains. In the description of the present disclosure, certain detailed explanations of related art are omitted when it is deemed that they may unnecessarily obscure the essence of the present disclosure.

For example, specific shapes, structures, and characteristics described in the present specification may be implemented by changing from one embodiment to another embodiment without departing from the spirit and scope of the present disclosure. In addition, it should be understood that the position or arrangement of individual components within each embodiment may be changed without departing from the spirit and scope of the present disclosure. Therefore, the following detailed description is not intended to be done in a limiting sense, and the scope of the present disclosure should be taken to cover the scope claimed by the claims and all equivalents thereto. Similar reference numerals in the drawings represent the same or similar components throughout several aspects. In other words, specific details described are simple examples. Specific implementations can vary from these exemplary details and can still be considered within the spirit and scope of the present disclosure.

It will be understood that although the terms "first," "second," etc. may be used herein to describe various components, these components should not be limited by these terms. The terms are used only to distinguish one component from other components.

The terms used in this application are only used to describe specific embodiments, and are not intended to limit the present disclosure. As used herein, the singular forms "a," "an," and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components. It will be understood that although the terms "first," "second," etc. may be used herein to describe various components, these components should not be limited by these terms. These terms are used only to distinguish one component from other components.

Hereinafter, embodiments of the present disclosure will be described below in more detail with reference to the accompanying drawings. Those components that are the same or are in correspondence are rendered the same reference numeral regardless of the figure number, and a redundant description therewith is omitted.

Figure 1:
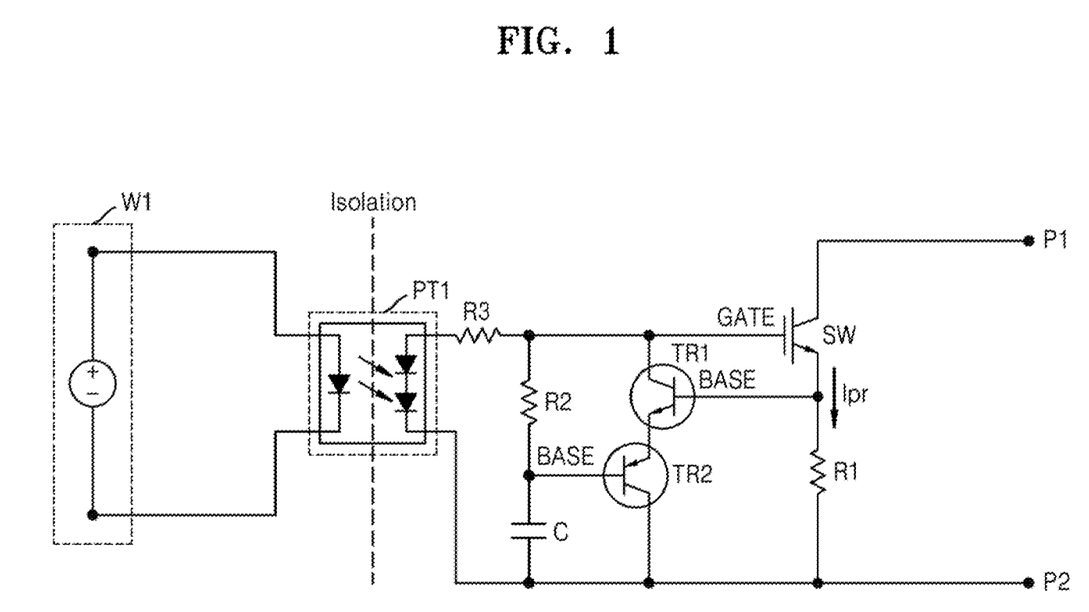
FIG. 1 illustrates a configuration of a device for controlling a pre-charge current generated when electrically connecting a first terminal and a second terminal, according to an embodiment of the present disclosure.

FIG. 1 illustrates the configuration of a device for controlling a pre-charge current generated when electrically connecting a first terminal P1 and a second terminal P2 according to an embodiment of the present disclosure.

Referring to FIG. 1, the device for controlling a pre-charge current according to an embodiment of the present disclosure may include the first terminal P1, the second terminal P2, a switch SW, a first transistor TR1, a second transistor TR2, a first resistor R1, a second resistor R2, a third resistor R3, a capacitor C, a photocoupler PT1, and a first power source W1.

The first terminal P1 and the second terminal P2 according to an embodiment of the present disclosure may be connected to two devices to be electrically connected to each other, respectively. For example, a second power source may be electrically connected to the first terminal P1, and a load driven by the second power source connected to the first terminal P1 may be electrically connected to the second terminal P2. In this case, the second power source connected to the first terminal P1 may be a high-voltage battery for driving an electric vehicle, for example, and the load connected to the second terminal P2 may be a motor for driving the electric vehicle, for example.

Moreover, the load connected to the second terminal P2 may include a capacitive component and/or an inductive component for generating the pre-charge current. In this case, pre-charge may refer to a phenomenon in which energy is momentarily supplied to a device in connection between two devices due to the capacitive and/or inductive component of the device. For example, a phenomenon in which, when connecting a power source (for example, the above-described second power source) to a load (for example, the above-described motor), energy is momentarily supplied to the load, may correspond to this pre-charge phenomenon. This phenomenon frequently occurs in the initial connection between two devices, which results in serious damage to the device with a momentary pre-charge current accompanied.

Figure 2:
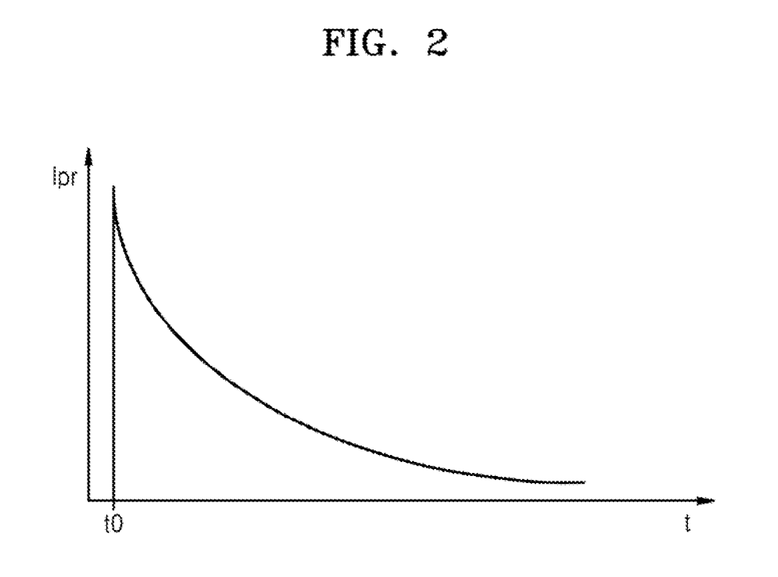
FIG. 2 is a view illustrating an aspect of a general pre-charge current.

FIG. 2 is a view illustrating an aspect of a general pre-charge current.

Referring to FIG. 2, a large pre-charge current Ipr accompanied by the pre-charge phenomenon momentarily occurs at an initial connection time point t0 of two devices (for example, a power source and a load), and then the pre-charge current Ipr decreases exponentially.

The pre-charge current Ipr that momentarily occurs at the initial connection time point t0, as described above, is out of a maximum current tolerance of the device (for example, the load), which may result in serious damage to the device and stress.

The present disclosure prevents serious damage to the device by properly controlling the pre-charge current Ipr, minimizes the stress of elements constituting the device, and further prevents the use of expensive elements in preparation for the pre-charge in design and manufacture of the device. A detailed description thereof will be provided later.

A switch SW according to an embodiment of the present disclosure may control the magnitude of a current flowing between the first terminal P1 and the second terminal P2 described above based on a GATE voltage of the switch SW or may interrupt electrical connection between the first terminal P1 and the second terminal P2. For example, the switch SW may increase the magnitude of the current flowing through the switch SW in proportion to the GATE voltage of the switch SW.

To this end, the switch SW may be positioned on a line for electrically connecting the first terminal P1 and the second terminal P2. In other words, if the switch SW is on a line electrically connecting the first terminal P1 and the second terminal P2, the switch SW may be arranged regardless of a relative position with other components.

The switch SW according to an embodiment of the present disclosure may be one of a field effect transistor (FET), a bipolar junction transistor (BJT), and an insulated gate bipolar mode transistor (IGBT). However, this is just an example, and the spirit of the present disclosure is not limited thereto, and any element capable of controlling the magnitude of a current flowing through itself according to an input voltage to GATE may be used as the switch SW of the present disclosure without limitation.

The first transistor TR1 according to an embodiment of the present disclosure may limit the magnitude of a pre-charge current on a line when the BASE voltage generated by the first resistor R1 is equal to or greater than a predetermined threshold voltage. In other words, the first transistor TR1 may be turned on when a BASE voltage generated by the first resistor R1 is equal to or greater than the predetermined threshold voltage, thereby decreasing a GATE voltage of the switch SW and thus the magnitude of a current flowing through the switch SW may be decreased and the magnitude of the pre-charge current may be limited. Moreover, the first resistor R1 described above may be arranged on the line for electrically connecting the first terminal P1 and the second terminal P2, and a detailed description thereof will be provided later.

On the other hand, the second transistor TR2 that will be described later may decrease the amount of a current flowing through the second transistor TR2 so that a BASE voltage of the second transistor T2 may be increased. Thus, at a time point when the first transistor TR1 is turned on, a BASE voltage of the second transistor TR2 may be relatively low. Thus, the GATE voltage of the switch SW at that time point may be decreased to a level similar to a reference potential GND. A detailed description thereof will be provided later.

The second transistor TR2 according to an embodiment of the present disclosure may control the magnitude of the pre-charge current between the first terminal P1 and the second terminal P2 based on a charging voltage of a capacitor C that will be described later. In more detail, the charging voltage of the capacitor C may be gradually increased by the first power source W1 according to an operation of the pre-charge current control device, and the charging voltage of the capacitor C may generate a BASE voltage of the second transistor TR2.

As described above, the second transistor TR2 may decrease a current flowing through the second transistor TR2 as the capacitor C is charged, thereby increasing the GATE voltage of the switch SW. In this case, the second transistor TR2 may linearly increase the GATE voltage of the switch WS so that the pre-charge current may be linearly increased.

Moreover, despite their names, the first transistor TR1 and the second transistor TR2 described above may be one of an FET, a BJT, and an IGBT. However, this is just an example, and the spirit of the present disclosure is not limited thereto.

The first resistor R1 according to an embodiment of the present disclosure may be arranged on the line for electrically connecting the first terminal P1 and the second terminal P2 so as to generate the BASE voltage of the first transistor TR1 that limits the magnitude of the pre-charge current on the line.

The second resistor R2 according to an embodiment of the present disclosure may control an operating time of the second transistor TR2 along with the capacitor C. In this case, the second transistor TR2 may decrease the current flowing through the second transistor TR2 as the capacitor C is charged, thereby increasing the GATE voltage of the switch SW.

Thus, in the present disclosure, the operating time of the second transistor TR2 may refer to a time required to decrease the current flowing through the second transistor TR2 to be equal to or less than a predetermined amount, i.e., a time required until the second transistor TR2 is turned off. As the operating time increases, the pre-charge current may be gently increased, and as the operating time decreases, the pre-charge current may be steeply increased.

A third resistor R3 according to an embodiment of the present disclosure is for preventing a short circuit and may electrically connect the photocoupler PT1 to be described later, to the second resistor R2.

The capacitor C according to an embodiment of the present disclosure may be charged by power supplied by the photocoupler PT1 to be described later, so that the pre-charge current may be gradually increased. The charging voltage of the capacitor C described above may generate the BASE voltage of the second transistor TR2. In addition, the GATE voltage of the switch SW may be changed by the BASE voltage of the second transistor TR2. Thus, the pre-charge current may be gradually increased according to charging of the capacitor C.

Moreover, the capacitor C may control the operating time of the second transistor TR2 along with the second resistor R2 described above. Because a description thereof has been provided above, it will be omitted.

The photocoupler PT1 according to an embodiment of the present disclosure may receive, in a state insulated from the first power source W1, an optical signal from the first power source W1 and may supply power. In more detail, the photocoupler PT1 may convert power supplied by the first power source W1 into an optical signal and may receive the optical signal again so that a right circuit may receive power in a state in which a circuit formed by the first power source W1 and a circuit for receiving power are insulated from each other.

Moreover, the first power source W1 may be a circuit different from the second power source connected to the first terminal P1 described above. For example, when the pre-charge current control device according to an embodiment of the present disclosure is provided in an electric vehicle, the first power source W1 may be a battery provided for starting a vehicle or driving electronic equipment, and the second power source may be a battery provided for driving the vehicle, i.e., driving the vehicle. However, this is just an example, and the spirit of the present disclosure is not limited thereto.

Hereinafter, an operation according to the passage of time of the pre-charge current control device according to an embodiment of the present disclosure will be described with reference to FIGS. 3 through 7. In addition, it is assumed that the second power source W2 is connected to the first terminal P1 and a capacitive load CL is connected to the second terminal P2 of the pre-charge current control device according to an embodiment of the present disclosure.

Figure 3:
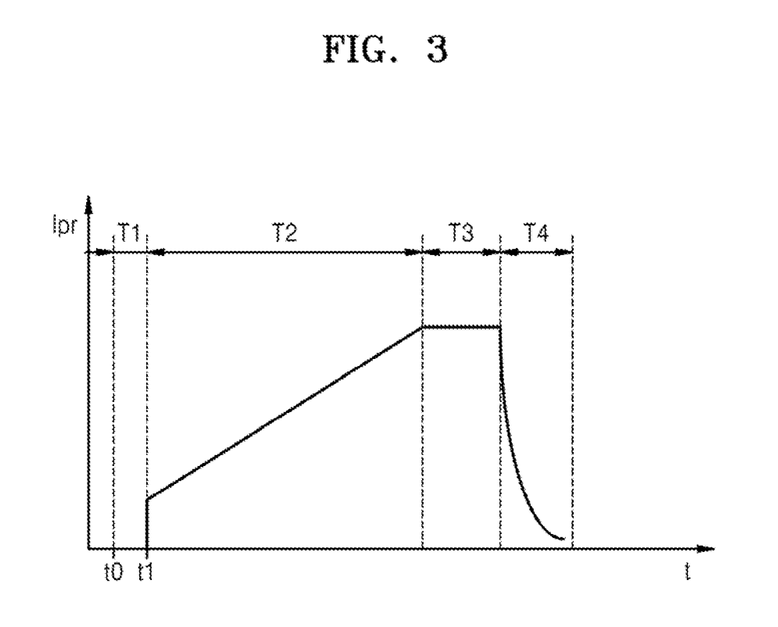
FIG. 3 is a view illustrating an aspect of a pre-charge current controlled by a pre-charge current control device according to an embodiment of the present disclosure.

FIG. 3 is a view illustrating an aspect of a pre-charge current controlled by a pre-charge current control device according to an embodiment of the present disclosure.

Compared to FIG. 2, the pre-charge current controlled by the pre-charge current control device according to an embodiment of the present disclosure is not steeply increased. In addition, when checking the magnitude of the current over time, a time period T1 in which the current does not flow (or a time period in which the current flows finely), a time period T2 in which the current linearly increases, a time period T3 in which the current is maintained at a constant level, and a time period T4 in which the current decreases, may be provided.

Hereinafter, the operation of the pre-charge current control device in each of time periods T1 through T4 or at a certain time point t0 will be mainly described.

Figure 4:
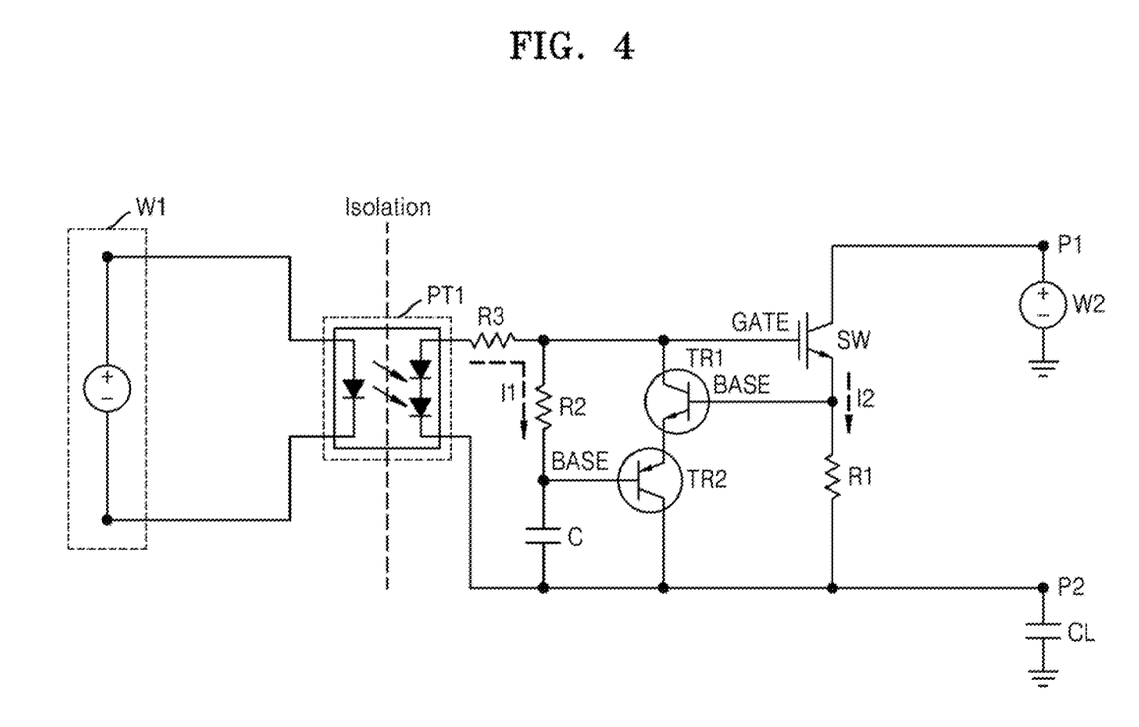
FIG. 4 is a view for explaining an operation of a pre-charge current control device at a time point t0 of FIG. 3.

FIG. 4 is a view for explaining an operation of the pre-charge current control device at a time point t0 of FIG. 3. For convenience of explanation, it is assumed that the supply of power by the first power source W1 starts from the time point t0.

Under the assumptions described above, the photocoupler PT1 may receive an optical signal from the first power source W1 to supply power to the right circuit of the device. Charging of the capacitor C may start due to a current I1 generated by power supplied by the photocoupler PT1.

A predetermined voltage may be applied to the GATE of the switch SW due to the power supplied by the photocoupler PT1. Thus, a fine current I2 may flow between the first terminal P1 and the second terminal P2.

After the time point t0, as the voltage applied to the GATE of the switch SW is increased, the fine current I2 may be gradually increased. Thus, a BASE voltage of the first transistor TR1 may be increased to a predetermined threshold voltage by the first resistor R1.

Figure 5:
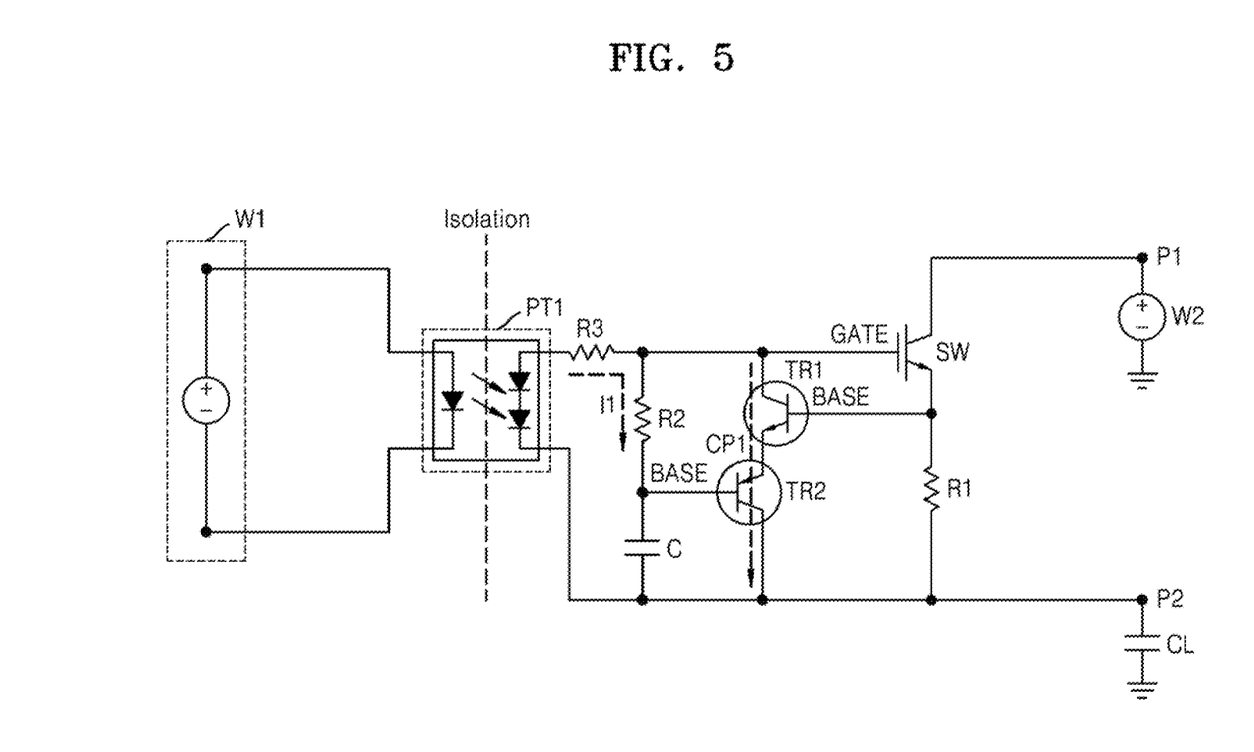
FIG. 5 is a view for explaining an operation of the current control device when a BASE voltage of a first transistor is increased to a predetermined threshold voltage in a time period T1.

FIG. 5 is a view for explaining an operation of the current control device when the BASE voltage of the first transistor TR1 is increased to a predetermined threshold voltage in a time period T1.

When a current (see I2 of FIG. 4) flowing through the first resistor R1 increases according to the process described with respect to FIG. 4 and thus the BASE voltage of the first transistor TR1 is equal to or greater than a predetermined threshold voltage, the first transistor TR1 may decrease the GATE voltage of the switch SW and may limit the magnitude of the pre-charge current Ipr.

In other words, the first transistor TR1 may be turned on when the BASE voltage generated by the first resistor R1 is equal to or greater than the predetermined threshold voltage, so that a path such as CP1 may be generated. Thus, the GATE voltage of the switch SW may be decreased to a level similar to the reference potential GND.

When the GATE voltage of the switch SW is decreased to the level similar to the reference potential GND, the switch SW may limit the pre-charge current Ipr between the first terminal P1 and the second terminal P2, as in the time period T1 of FIG. 3.

Figure 6:
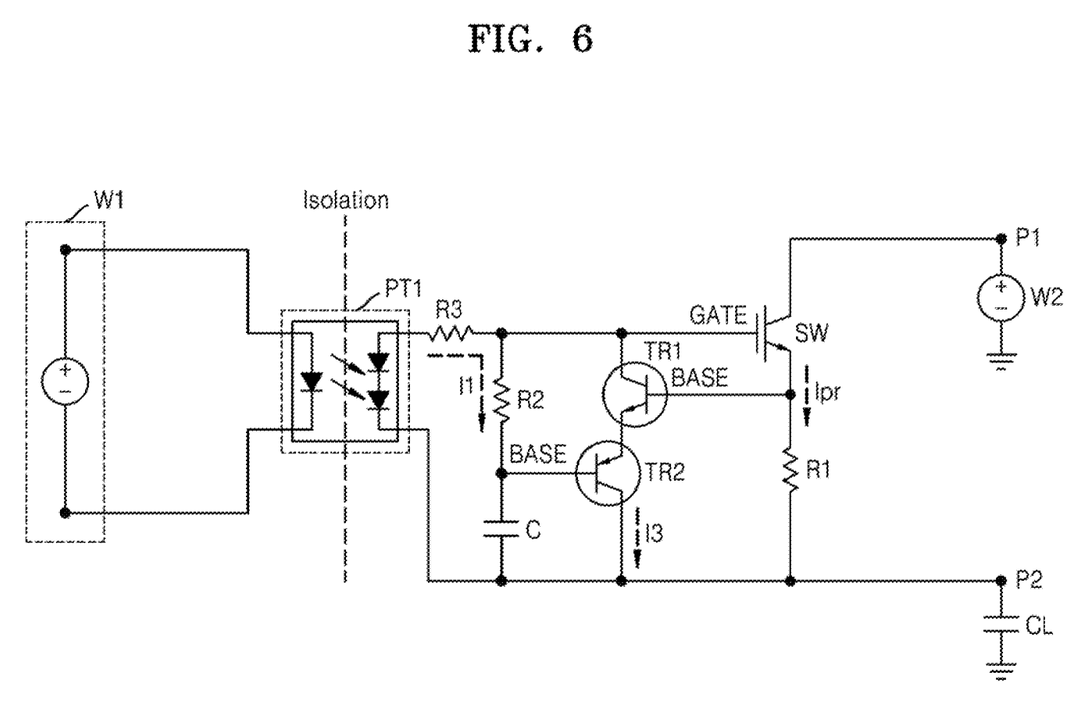
FIG. 6 is a view for explaining an operation of the current control device when a BASE voltage of a second transistor is gradually increased in a time period T2 and a time period T3.

FIG. 6 is a view for explaining an operation of the current control device when a BASE voltage of a second transistor TR2 is gradually increased in a time period T2 and a time period T3.

As described with respect to FIG. 5, the GATE voltage of the switch SW may be decreased to the level similar to the reference potential GND through the path such as CP1 of FIG. 5 at the time point t1 (i.e., in the time period T1).

After the time point t1, the BASE voltage of the second transistor TR2 may be increased based on the charging voltage of the capacitor C. The second transistor TR2 may decrease the current flowing through the second transistor TR2 as the BASE voltage increases. Thus, the GATE voltage of the switch SW may be increased.

In this case, the second transistor TR2 may linearly increase the GATE voltage of the switch SW so that the pre-charge current Ipr may be linearly increased, as in the time period T2 of FIG. 3.

Moreover, the pre-charge current Ipr may be limited to a predetermined value, as in the time period T3 of FIG. 3, according to a voltage generated by the photocoupler PT1.

Figure 7:
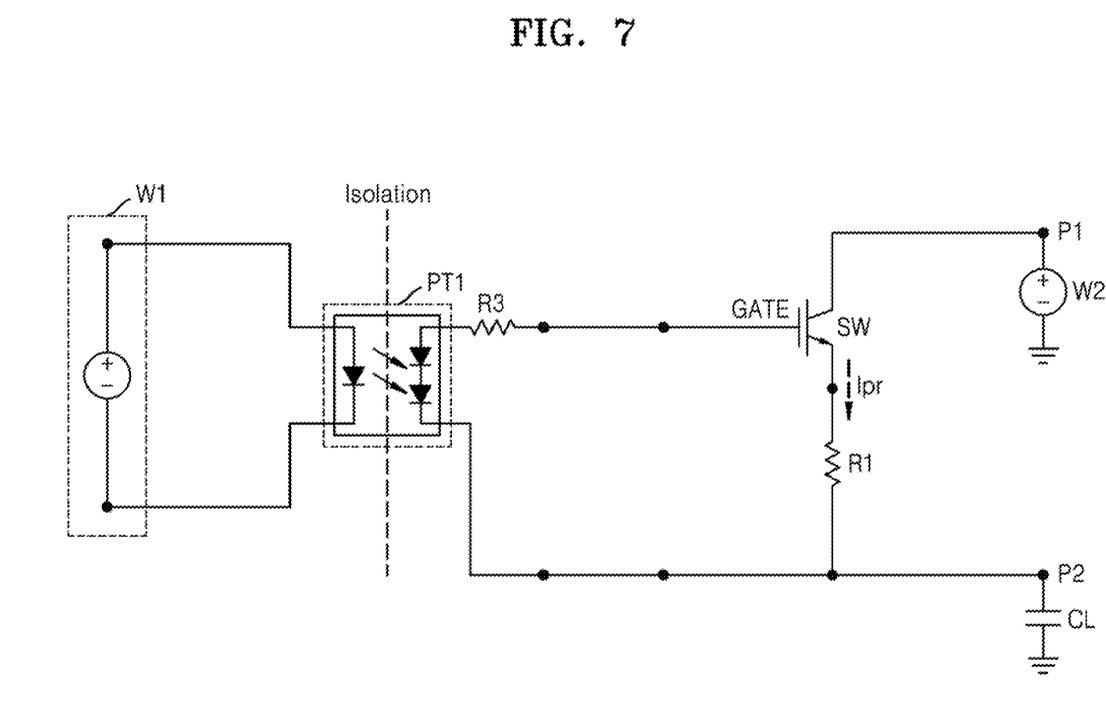
FIG. 7 is a view illustrating an equivalent circuit of the pre-charge current control device when a pre-charge current is gradually decreased in a time period T4.

FIG. 7 is a view illustrating an equivalent circuit of the pre-charge current control device when a pre-charge current is gradually decreased in a time period T4.

The pre-charge current may refer to a phenomenon in which energy is momentarily supplied to a device due to the capacitive load CL connected to the device. Thus, the amount of the pre-charge current is limited, and the pre-charge current may momentarily occur only in the initial connection between two devices.

The pre-charge current may be decreased, as in the time period T4 of FIG. 3, when charging of the capacitive load CL connected to the device is completed. In this case, the GATE voltage of the switch SW may be maintained at a predetermined voltage by power supplied by the photocoupler PT1. In addition, the switch SW may maintain the short-circuit state of the first terminal P1 and the second terminal P2 due to the GATE voltage maintained at the predetermined voltage.

In this way, the present disclosure may prevent a momentarily excessive current from being supplied to a device, so that the failure of the device or an increase in the fatigue of elements constituting the device may be prevented.

The present disclosure may prevent the generation of high momentary power generated by a pre-charge current so that the need for the use of high-cost devices in the manufacture and design of a device may be reduced.

The present disclosure has been particularly shown and described with reference to exemplary embodiments thereof. It will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A device for controlling a pre-charge current generated when electrically connecting a first terminal and a second terminal, the device comprising:
   a switch for controlling a magnitude of a current flowing between the first terminal and the second terminal;
   a first resistor for generating a base voltage of a first transistor in proportion to a magnitude of the pre-charge current flowing between the first terminal and the second terminal;
   the first transistor for limiting the magnitude of the pre-charge current when a voltage generated by the first resistor is equal to or greater than a predetermined threshold voltage;
   a photocoupler for receiving, in a state insulated from a first power source, an optical signal from the first power source and supplying power;
   a capacitor charged by the power supplied by the photocoupler;
   a second transistor for controlling the magnitude of the pre-charge current on a basis of a charging voltage of the capacitor; and
   a second resistor for controlling an operating time of the second transistor along with the capacitor.

2. The device of claim 1, wherein:
   the charging voltage of the capacitor generates a base voltage of the second transistor, and
   as the capacitor is charged by the power supplied by the photocoupler, the second transistor decreases a current flowing through the second transistor so as to increase a gate voltage of the switch.

3. The device of claim 2, wherein the second transistor decreases the current flowing through the second transistor so as to linearly increase the gate voltage of the switch.

4. The device of claim 1, wherein the switch increases a magnitude of a current flowing through the switch in proportion to a gate voltage of the switch.

5. The device of claim 1, wherein, when the voltage generated by the first resistor is equal to or greater than a predetermined threshold voltage, the first transistor decreases a gate voltage of the switch so as to limit the magnitude of the pre-charge current.

6. The device of claim 1, further comprising a third resistor for preventing a short circuit,
   wherein the third resistor electrically connects the photocoupler and the second resistor.

7. The device of claim 1, wherein:
   a second power source is electrically connected to the first terminal, and
   a load is electrically connected to the second terminal.

8. The device of claim 7, wherein the load comprises a capacitive element for generating the pre-charge current.

9. The device of claim 8, wherein:
   when charging of the capacitive element is completed, the pre-charge current is decreased,
   when charging of the capacitive element is completed, a gate voltage of the switch is maintained at a predetermined voltage by the power supplied by the photocoupler, and
   the switch maintains a short-circuit state of the first terminal and the second terminal by the gate voltage maintained at the predetermined voltage.

* * * * *